(12) United States Patent
Miyazaki

(10) Patent No.: US 6,414,772 B2
(45) Date of Patent: Jul. 2, 2002

(54) METHOD AND APPARATUS FOR TRANSMITTING A WAVELENGTH DIVISION MULTIPLEXED (WDM) SIGNAL THROUGH AN OPTICAL TRANSMISSION LINE TO REDUCE THE EFFECTS OF STIMULATED BRILLOUIN SCATTERING (SBS)

(75) Inventor: Takashi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/035,077

(22) Filed: Mar. 5, 1998

(30) Foreign Application Priority Data

Mar. 5, 1997 (JP) ............................................ 9-050738

(51) Int. Cl.$^7$ ................................................ H04J 14/02
(52) U.S. Cl. ...................................... 359/133; 359/161
(58) Field of Search ................................ 359/124, 133, 359/134, 161, 173, 188, 195; 385/24

(56) References Cited

U.S. PATENT DOCUMENTS

| 3,705,992 A | | 12/1972 | Ippen et al. ................. 359/327 |
| 4,168,427 A | | 9/1979 | Hubbard ...................... 359/152 |
| 4,560,246 A | | 12/1985 | Cotter ......................... 356/156 |
| 5,515,192 A | * | 5/1996 | Watanabe .................... 359/124 |
| 5,559,910 A | * | 9/1996 | Taga et al. .................... 385/24 |
| 5,956,166 A | * | 9/1999 | Ogata et al. ................. 359/133 |

FOREIGN PATENT DOCUMENTS

| EP | 0 758 169 A2 | 2/1997 | ............ H04J/14/02 |

OTHER PUBLICATIONS

Yamamoto et al., "Coherent Optical Fiber Transmission Systems", IEEE Journal Of Quantum Electronics, vol. QE–17, No. 6, Jun., 1981, pp. 919–935.

Yamamoto et al., "Coherent Optical Fiber Transmission Technology", The Institute of Electronics, Information and Communication Engineers Technical Report, vol. 81, No. 27, OQE81–8, May 21, 1981.

"McGraw–Hill Encyclopedia of Science and Technology", 1960, p. 103.

"McGraw–Hill Dictionary of Scientific and Technical Terms", Third Edition, 1984, p. 1196.

John Bellamy, "Digital Telephony", published by John Wiley & Sons, Inc., 1982, p. 277–278.

P.B. Hansen, et al., "8 × 10 Gb/s WDM Repeaterless Transmission Over 352 km", IOOC 95, PD2–4, p. 27.

"Series O: Specifications of Measuring Equipment, Equipment for the measurement of digital and analogue/digital parameters, General requirements for instrumentation for performance measurements on digital transmission equipment", ITU–T Recommendation 0.150, May 1996.

"Specification Of Measuring Equipment, Error Performance Measuring Equipment Operating At The Primary Rate and Above", The International Telegraph and Telephone Consultative Committee (CCITT), Recommendation 0.151, Oct. 1992.

\* cited by examiner

Primary Examiner—Kinfe-Michael Negash
(74) Attorney, Agent, or Firm—Staas & Halsey LLP

(57) ABSTRACT

A method and apparatus for transmitting a wavelength division multiplexed (WDM) signal through an optical transmission line to reduce the effects of stimulated Brillouin scattering (SBS). The WDM signal includes a plurality of light signals multiplexed together. The WDM signal is transmitted through the optical transmission line so that the intensity per light signal is higher than an intensity threshold at which stimulated Brillouin scattering (SBS) occurs for a single light signal individually transmitted to the optical transmission line.

50 Claims, 15 Drawing Sheets

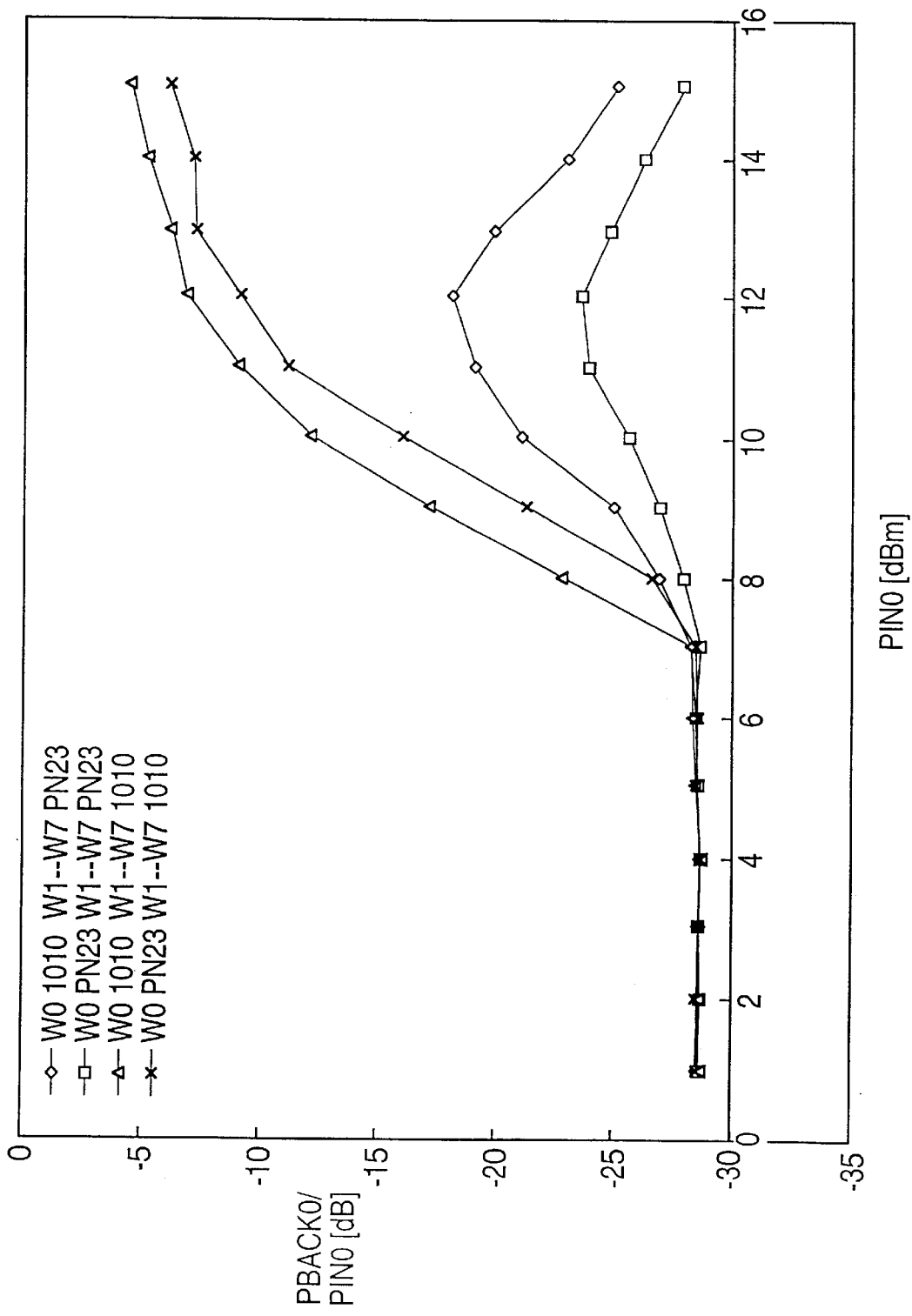

| CYCLE | GENERATING POLYNOMINAL | GENERATING PATTERNS |
|---|---|---|
| $2^7 - 1$ | $1 + X^6 + X^7$ | |
| $2^9 - 1$ | $1 + X^5 + X^9$ | |
| $2^{11} - 1$ | $1 + X^9 + X^{11}$ | |
| $2^{15} - 1$ | $1 + X^{14} + X^{15}$ | |
| $2^{20} - 1$ | $1 + X^3 + X^{20}$ | |
| $2^{23} - 1$ | $1 + X^{18} + X^{23}$ | |
| $2^{31} - 1$ | $1 + X^{28} + X^{31}$ | |

METHOD AND APPARATUS FOR TRANSMITTING A WAVELENGTH DIVISION MULTIPLEXED (WDM) SIGNAL THROUGH AN OPTICAL TRANSMISSION LINE TO REDUCE THE EFFECTS OF STIMULATED BRILLOUIN SCATTERING (SBS)

CROSS-REFERENCE TO RELATED APPLICATIONS

This application is based on, and claims priority to, Japanese application number 09-050738, filed on Mar. 5, 1997, in Japan, and which is incorporated herein by reference.

BACKGROUND OF THE INVENTION

1. Field of the Invention

The present invention relates to the transmission of a wavelength division multiplexed (WDM) signal through an optical fiber transmission line to reduce or eliminate the effects of stimulated Brillouin scattering (SBS).

2. Description of the Related Art

Optical communication systems using fiber optical transmission lines are being used to transmit relatively large amounts of information. In a typical optical communication system, a light source produces light which is then modulated with data. The modulated light is input to, and transmitted through, an optical fiber transmission line. A receiver receives the modulated light from the optical fiber transmission line, and demodulates the light to obtain the data.

Unfortunately, the transmission quality of the transmitted light will be reduced by stimulated Brillouin scattering (SBS) if the intensity of the light input to the optical fiber transmission line is greater than a predetermined SBS threshold level.

More specifically, SBS refers to a phenomenon in which a nonlinear effect occurs in an optical fiber transmission line when a coherent light from a light source is input to the optical fiber transmission line at a higher intensity than a predetermined SBS threshold level, and the optical incident power is progressively increased. As a result of SBS, a light having higher light intensity is returned to the light source. This returned light has an undesirable effect on the light source.

In particular, SBS has a severely negative influence when the light source is a semiconductor laser and an optical fiber amplifier is used to amplify the light produced by the semiconductor laser.

Therefore, the intensity of light produced by a light source and input to an optical fiber transmission line is limited by the SBS threshold level of the optical fiber transmission line, thereby limiting the transmission distance.

Various conventional techniques are available for suppressing SBS. For example, in a conventional technique, the intensity of light produced by a light source is below the SBS threshold level. See, for example, U.S. Pat. No. 4,560,246.

In an additional conventional technique, the optical frequency or phase of the optical signal input to an optical transmission line is modulated to spread the coherent optical spectrum, to thereby suppress SBS. See, for example, "Nonlinear fiber optics" by Govind P. Agrawal, published by the Academic Press, Inc., pages 268 and 269.

SBS also occurs in optical communication systems employing wavelength division multiplexing (WDM). Generally, WDM is used in optical communication systems to transfer a relatively large amount of data at a high speed. With WDM, a plurality of light signals, each modulated with information, is combined into a wavelength division multiplexed (WDM) light. The WDM light is then transmitted through a single optical fiber (an optical fiber transmission line) to a receiver. The receiver splits the WDM light into the individual light signals, so that the individual light signals can be detected. In this manner, a communication system can transfer a relatively large amount of data over a single optical fiber.

In optical communication systems employing WDM, the above-described conventional techniques can be used to suppress SBS. For example, the light signals in the WDM signal can be set at an intensity which is lower than the SBS threshold level of the optical fiber. Alternatively, in optical communication systems employing WDM, the frequency or phase of light signals produced by a light source can be modulated to suppress SBS.

Unfortunately, with the conventional techniques for suppressing SBS, the intensity of a light signal produced by a light source is limited since it must be below the SBS threshold level. As a result, when the number of light signals multiplexed together into the WDM signal is increased, the intensity per light signal will likely be further reduced, thereby reducing the transmission distance of the WDM signal.

SUMMARY OF THE INVENTION

It is an object of the present invention to provide a method an apparatus for suppressing SBS in an optical communication system employing WDM, where the intensity of lights produced by light sources can be above the SBS threshold level.

Additional objects and advantages of the invention will be set forth in part in the description which follows, and, in part, will be obvious from the description, or may be learned by practice of the invention.

The foregoing objects of the present invention are achieved by providing and apparatus and method for transmitting a wavelength division multiplexed (WDM) signal through an optical fiber transmission line. The WDM signal includes a plurality of light signals multiplexed together. The WDM signal is transmitted to the optical transmission line so that the intensity per light signal is higher than an intensity threshold at which stimulated Brillouin scattering (SBS) occurs for a single light signal individually transmitted to the optical transmission line. Preferably, the WDM signal includes at least six light signals multiplexed together Moreover, the intensity of each light signal can be higher than the intensity threshold at which SBS occurs for a single light signal individually transmitted to the optical transmission line.

Objects of the present invention are also achieved by providing an optical communication system which suppresses SBS. At least six light sources each produce a respective, corresponding light signal. The light signal produced by each respective light source is at a different wavelength than the light signals produced by the other light sources. At least six modulators correspond, respectively, to the at least six light sources. Each modulator modulates the light signal produced by the corresponding light source. A multiplexer multiplexes the modulated light signals into a wavelength division multiplexed (WDM) signal. The WDM signal is transmitted through the optical transmission line so that the intensity per light signal is higher than an intensity threshold at which stimulated Brillouin scattering (SBS) occurs for a single light signal individually transmitted to the optical transmission line.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 5 is an additional diagram showing the SBS threshold level of the optical communication system in FIG. 1 when a coded pattern is changed, according to an embodiment of the present invention.

DESCRIPTION OF THE PREFERRED EMBODIMENTS

Figure 1:
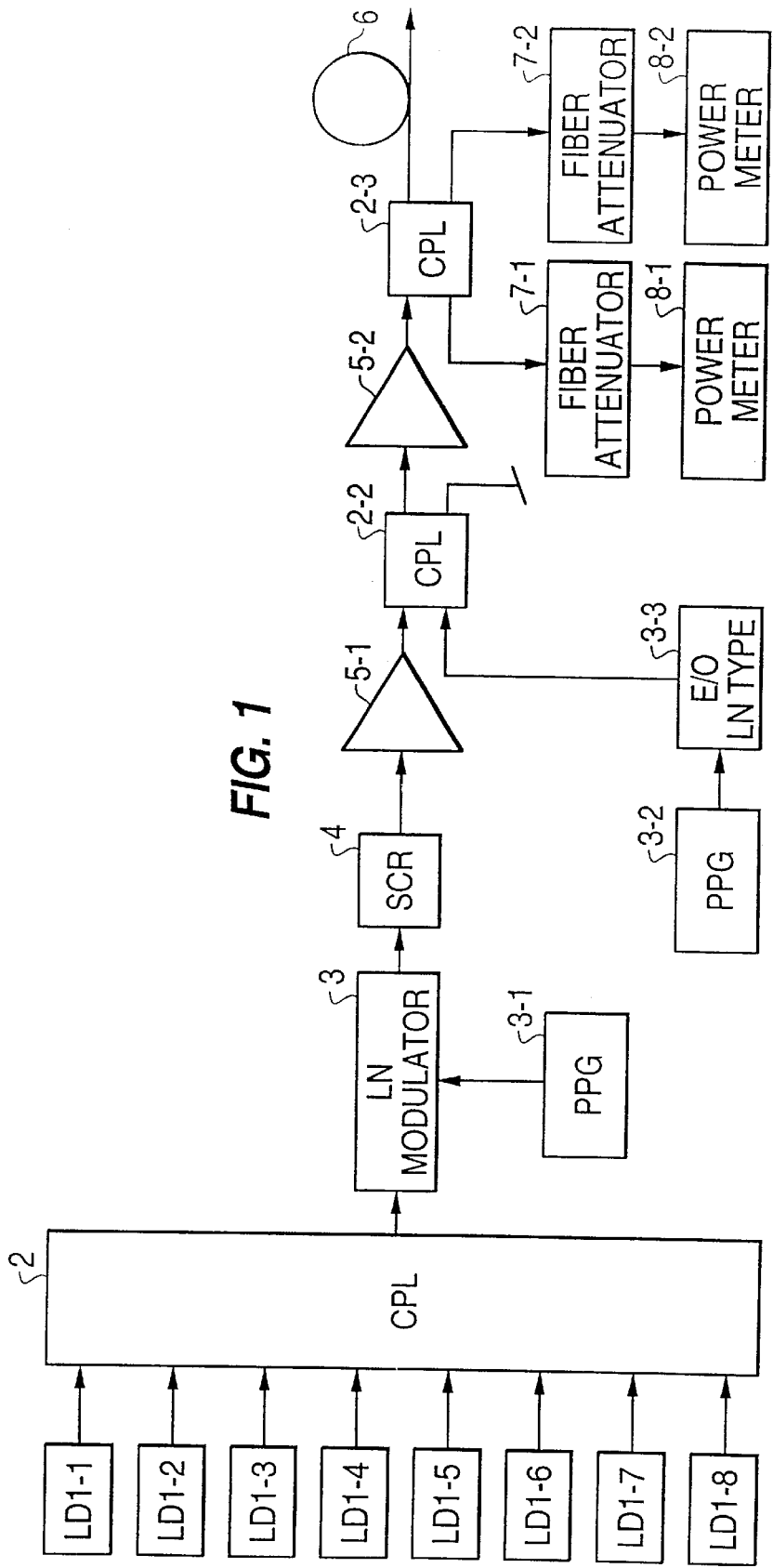
FIG. 1 is a diagram illustrating an optical communication system which measures a characteristic of an optical signal to suppress SBS, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating an optical communication system which measures a characteristic of an optical signal to suppress SBS, according to an embodiment of the present invention. Referring now to FIG. 1, semiconductor lasers (LD) 1—1 through 1-8 each emit a respective light signal. Each light signal is preferably at a different wavelength than the other light signals, so that each light signal represents a different channel for transmitting information. An optical coupler (CPL) 2 multiplexes the light signal into a wavelength division multiplexed (WDM) signal, and an optical modulator (LN Modulator) 3 modulates the WDM signal. Preferably, optical modulator 3 digitally modulates the amplitude of a pseudo-random pattern PN 23 using an NRZ signal from a pulse pattern generator (PPG) 3-1. Pseudo-random patterns, such as PN 23, will be described in more detail below.

A polarization scrambler (SCR) 4 passes the WDM signal without scrambling. Optical amplifiers 5-1 and 5-2 amplify the WDM signal and then transmit it to an optical transmission line 6 made of, for example, pure silica fiber. Optical transmission line 6 has a length of, for example, 140 Km.

The intensity of light input to optical transmission line 6 is detected by a light intensity monitor (power meter) 8-2 through an attenuator 7-2. Moreover, if SBS occurs, light will be returned back through optical transmission line 6. The returned light is detected by a light intensity monitor (power meter) 8-1 through an attenuator 7-1.

FIG. 1 also illustrates an LN type E/O module 3-3 and a pulse pattern generator (PPG) 3-2, which will be described in more detail further below.

Figure 2:
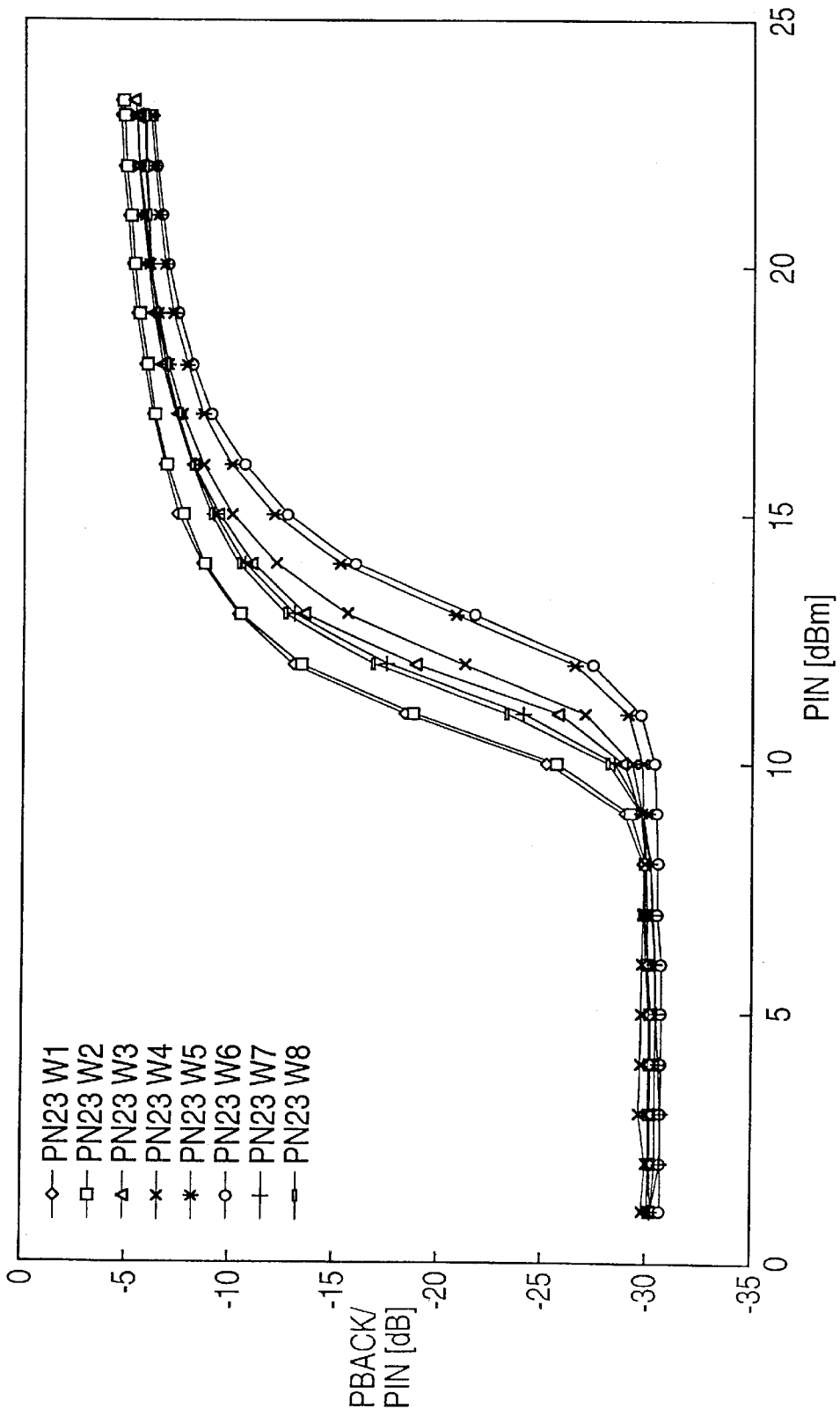
FIG. 2 is a graph showing the SBS threshold level for each semiconductor laser of the optical communication system in FIG. 1, according to an embodiment of the present invention.

FIG. 2 is a graph showing the SBS threshold level for semiconductor lasers 1-1, 1-2, 1-3, 1-4, 1-5, 1-6, 1-7 and 1-8, according to an embodiment of the present invention. In FIG. 2, the horizontal axis represents $P_{IN}$, that is, the intensity detected by light intensity monitor 8-2. The vertical axis represents $P_{BACK}/P_{IN}$, that is, the ratio of the intensity detected by light intensity monitor 8-1 to the intensity detected by light intensity monitor 8-2.

In the example of FIG. 2, the wavelength of the light signal produced by semiconductor laser 1-1 is, for example, 1553.9 nm and is hereinafter referred to as "W1". The wavelength of the light signal produced by semiconductor laser 1-2 is, for example, 1554.9 nm and is hereinafter referred to as "W2". The wavelength of the light signal produced by semiconductor laser 1-3 is, for example, 1555.9 nm and is hereinafter referred to as "W3". The wavelength of the light signal produced by semiconductor laser 1-4 is, for example, 1556.9 nm and is hereinafter referred to as "W4". The wavelength of the light signal produced by semiconductor laser 1-5 is, for example, 1557.9 nm and is hereinafter referred to as "W5". The wavelength of the light signal produced by semiconductor laser 1-6 is, for example, 1558.9 nm and is hereinafter referred to as "W6". The wavelength of the light signal produced by semiconductor laser 1-7 is, for example, 1559.9 nm and is hereinafter referred to as "W7". The wavelength of the light signal produced by semiconductor laser 1-8 is, for example, 1560.9 nm and is hereinafter referred to as "W8".

As indicated by FIG. 2, the SBS threshold level of the light signals produced by the semiconductor lasers is not fixed, but is in a range from 8 dBm to 11 dBm. Moreover, each wavelength exhibits a similar shaped characteristic curve. As previously described, the SBS threshold level is the level of the light signal which causes light to be returned back to the semiconductor laser through optical transmission line 6.

Figure 3:
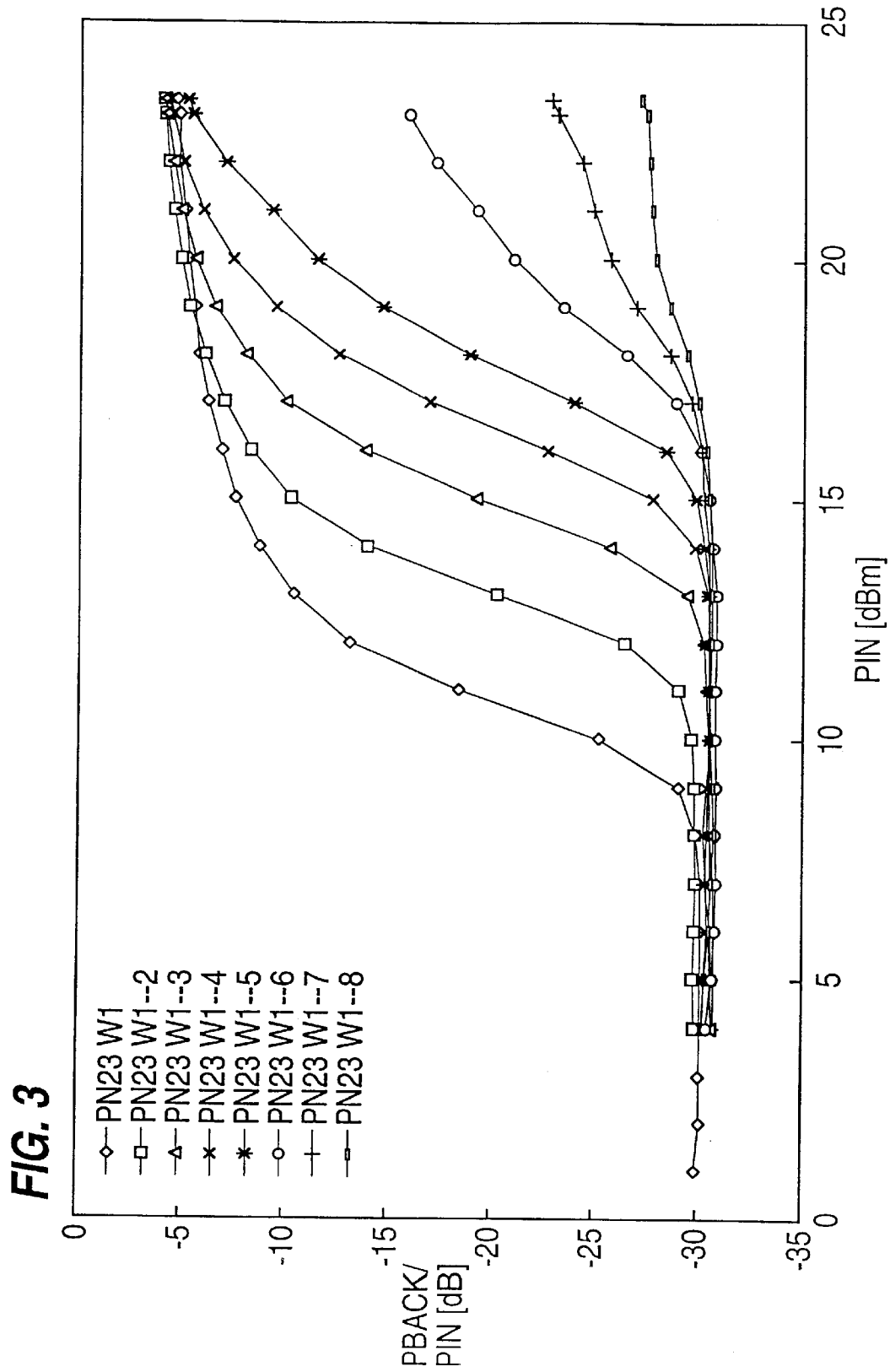
FIG. 3 is a graph showing the SBS threshold level of the optical communication system in FIG. 1 when the number of wavelength multiplexed light signals is increased, according to an embodiment of the present invention.

FIG. 3 is a graph showing the SBS threshold level of the optical communication system in FIG. 1 when the number of wavelength multiplexed light signals is increased, according to an embodiment of the present invention. More specifically, FIG. 3 shows the case in which a plurality of light signals at different wavelengths are added one by one, starting with semiconductor laser 1-1 under the conditions shown in FIG. 2. In FIG. 3, W1 indicates the case where semiconductor laser 1-1 singly emits a light signal. W1–W2 indicates the case in which light signals are emitted from both semiconductor lasers 1-1 and 1-2. W1–W3 indicates the case in which light signals are emitted from all of semiconductor lasers 1-1 through 1-3. Similarly, semiconductor lasers are increased one by one to measure the SBS threshold level of each of the combinations up to W1–W8.

Referring now to FIG. 3, the SBS threshold level (that is, the level of the light input into optical transmission line 6 which causes light to be returned back to the semiconductor lasers) of W1 is approximately 8 dBm. The SBS threshold level of W1–W2 is approximately 10 dBm with 7 dBm per wave. The SBS threshold level of W1–W3 is approximately 13 dBm with 8 dBm per wave. The SBS threshold level of W1–W4 is approximately 14 dBm with 8 dBm per wave. The SBS threshold level of W1–W5 is approximately 15 dBm with 8 dBm per wave. The SBS threshold level of W1–W6 is approximately 16 dBm with 8.2 dBm per wave. The SBS threshold level of W1–W7 is approximately 16 dBm with 7.5 dBm per wave. The SBS threshold level of W1–W8 is approximately 16 dBm with 7 dBm per wave.

Here, the above-described SBS threshold levels are directly identifiable from FIG. 3. For example, as indicated above, the SBS threshold level of W1–W2 is approximately 10 dBm. This SBS threshold level can be seen from FIG. 3, where light begins returning at approximately 10 dBm for W1–W2. The above-described "per wave" values (such as the 7 dBm "per wave" value for W1–W2) can easily be determined from the data in FIG. 3.

As illustrated in FIG. 3, as the number of light signals, or wavelengths, multiplexed together becomes equal to or greater than six (6), the slope of the corresponding characteristic curve decreases. More specifically, the rate of increase of SBS decreases as the number of multiplexed light signals is set at six (6) or more.

Therefore, the rate of increase for the value of a returned light from optical transmission line 6 exceeding the SBS threshold level can be reduced by setting the number of multiplexed light signals, or wavelengths, to six (6) or more, thereby suppressing SBS.

Figure 4:
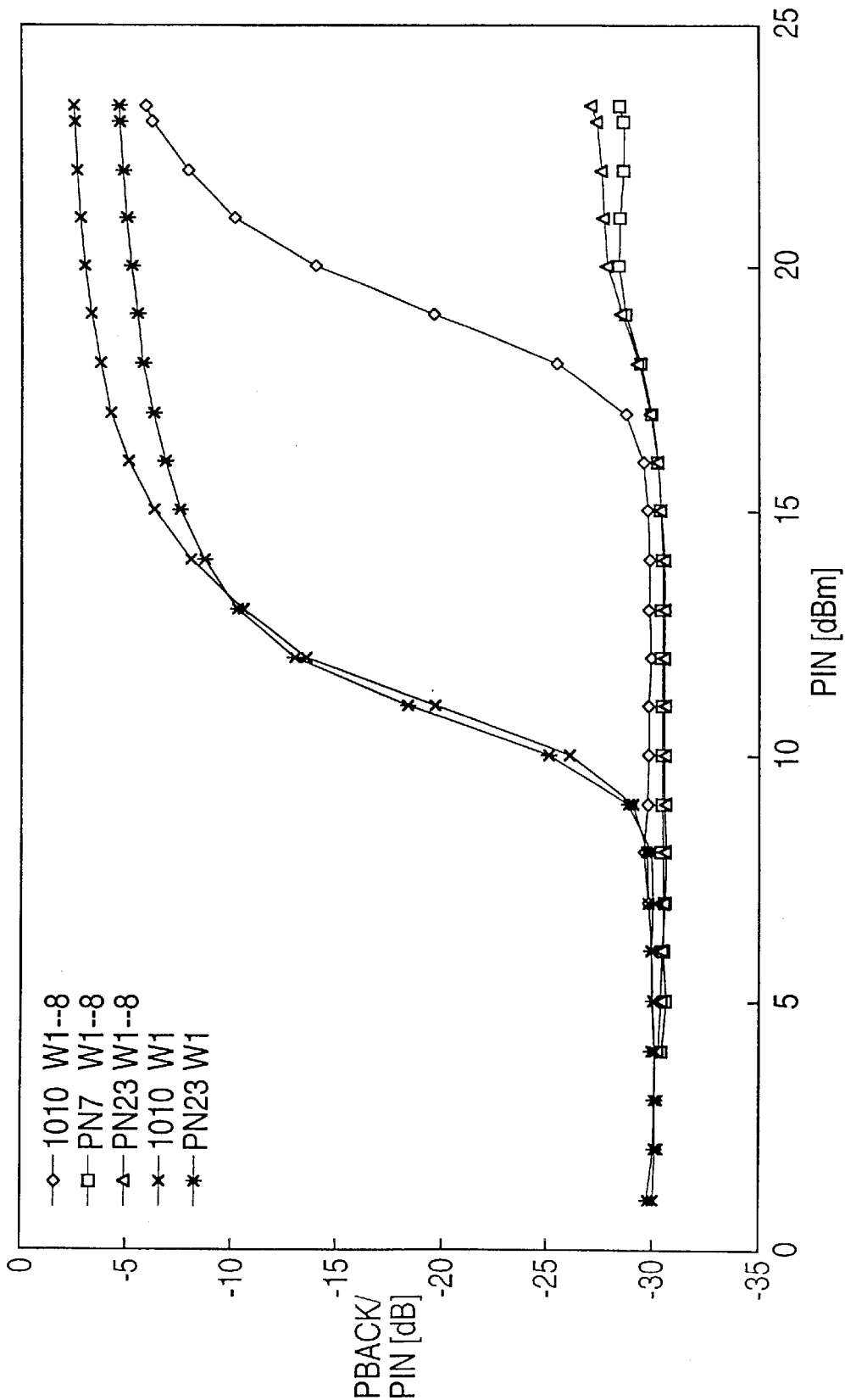
FIG. 4 is a diagram showing the SBS threshold level of the optical communication system in FIG. 1 when a coded pattern is changed, according to an embodiment of the present invention.
Figure 6A:
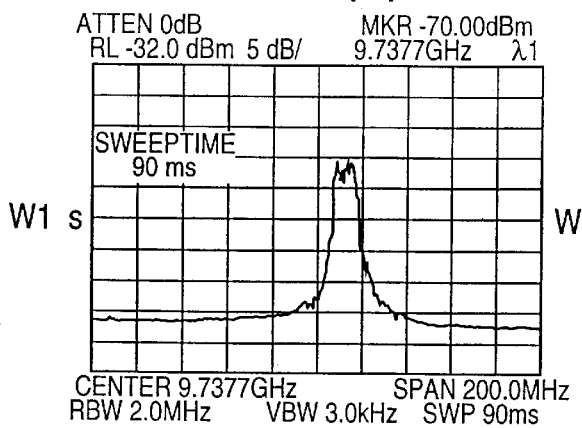
FIGS. 6(A), 6(B), 6(C), 6(D), 6(E), 6(F) and 6(G) are graphs illustrating spectrum characteristics of the semiconductor lasers illustrated in FIG. 1, according to an embodiment of the present invention.
Figure 6D:
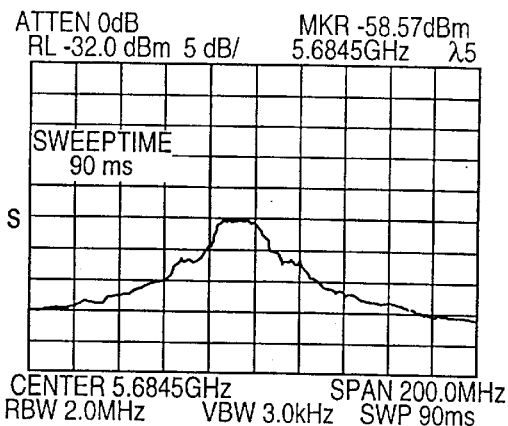
Figure 6B:
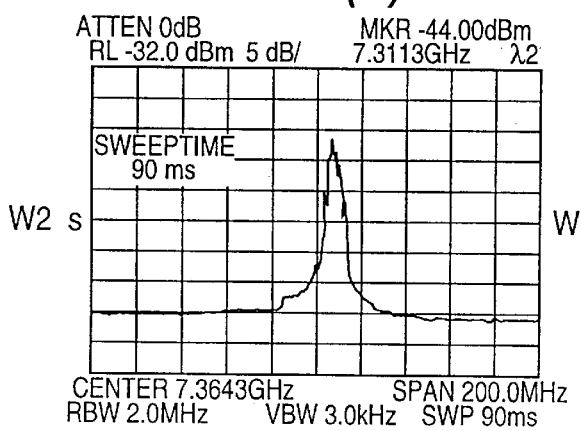
Figure 6E:
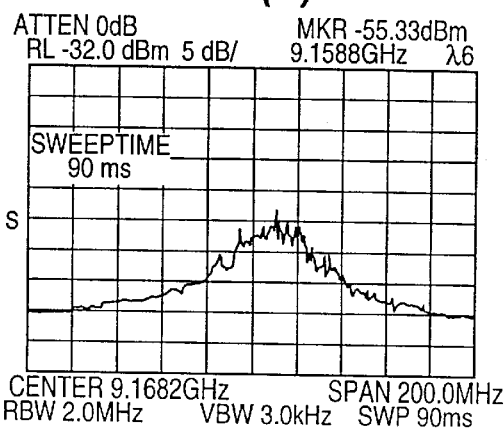
Figure 6C:
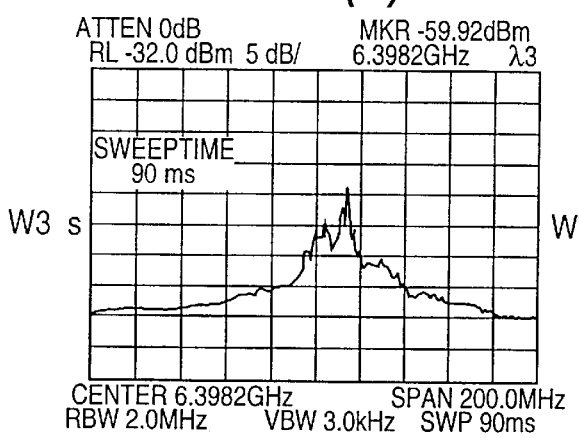
Figure 6F:
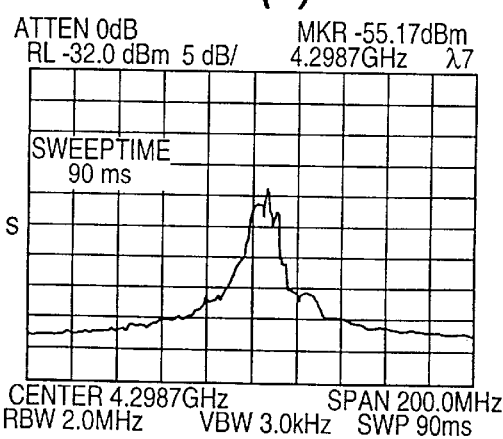
Figure 6G:
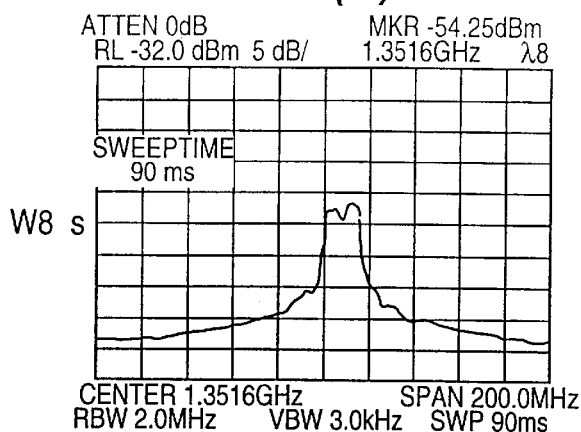

FIG. 4 is a diagram showing the SBS threshold level of the optical communication system in FIG. 1 when a coded pattern is changed, according to an embodiment of the present invention.

Referring now to FIG. 4, 1010 W1–8 indicates the state in which a WDM signal having the wavelengths W1 to W8 is modulated by optical modulator 3 according to the alternating signal of *1010* from pulse pattern generator 3-1 shown in FIG. 1. PN7 W1–W8 indicates the state in which a WDM signal having the wavelengths W1 to W8 is modulated according to the signal of the pseudo-random pattern PN7. PN23 W1–W8 indicates the state in which a WDM signal having the wavelengths W1 to W8 is modulated according to the signal of the pseudo-random pattern PN23. 1010 W1 indicates the state in which a light having the wavelength W1 is modulated according to the alternating signal of *1010*. PN23 W1 indicates the state in which a light having the wavelength W1 is modulated according to the signal of the pseudo-random pattern PN23.

As indicated by FIG. 4, a longer period pseudo-random pattern produces a higher SBS suppression effect with a fixed number of multiplexed light signals, or wavelengths.

FIG. 5 is an additional diagram showing the SBS threshold level of the optical communication system in FIG. 1 when a coded pattern is changed, according to an embodiment of the present invention.

More specifically, FIG. 5 shows the case in which, referring to FIG. 1, semiconductor lasers 1-1 through 1-7 produce light signals at wavelengths W1 through W7, respectively, and which are modulated by E/O module 3-3. E/O module 3-3 generates a light with the wavelength W0 (1552.0 nm) using a common coding pattern and a pattern generated by pulse pattern generator 3-2. The modulated light signals are combined by optical coupler 2-2 and then provided to optical transmission line 6.

W0 1010 W1–W7 PN23 indicates that W0 is modulated using the alternating signal *1010*, and W1 through W7 are modulated using the pseudo-random pattern PN23. W0 PN23 W1–W7 PN23 indicates that all of W0 and W1 through W7 are modulated using the pseudo-random pattern PN23. W0 1010 W1–W7 1010 indicates that all of W0 and W1 through W7 are modulated using the alternating signal *1010*. W0 PN23 W1–W7 1010 indicates that W0 is modulated using the pseudo-random pattern PN23, and W1 through W7 are modulated using the alternating signal *1010*.

As indicated by FIG. 5, a longer period pseudo-random pattern code produces a higher SBS suppression effect.

FIGS. 6(A), 6(B), 6(C), 6(D), 6(E), 6(F) and 6(G) are graphs illustrating the spectrum characteristics of semiconductor lasers illustrated in FIG. 1, according to an embodiment of the present invention. More specifically, FIGS. 6 (A), 6(B), 6(C), 6(D), 6 (E), 6(F) and 6(G) are graphs illustrating, respectively, the spectrum measured when a single one of the wavelengths W1, W2, W3, W5, W6, W7 and W8 is emitted from the corresponding semiconductor laser 1-1 through 1-8. The wavelength of semiconductor laser 1-4 is unstable, so a result cannot be provided for W4. Therefore, no graph is illustrated for the wavelength W4.

The total input power of the eight multiplexed light signals (W1 to W8) to optical transmission line 6 was measured at 23 dBm.

FIGS. 7(A), 7(B), 7(C) and 7(D) are graphs showing spectrums measured at the output end of optical transmission line 6 (140 km), and illustrating the difference in characteristics between different coding patterns when 23 dBm is input to optical transmission line 6 with eight (8) multiplexed light signals with wavelengths W1 to W8, respectively.

Figure 7A:
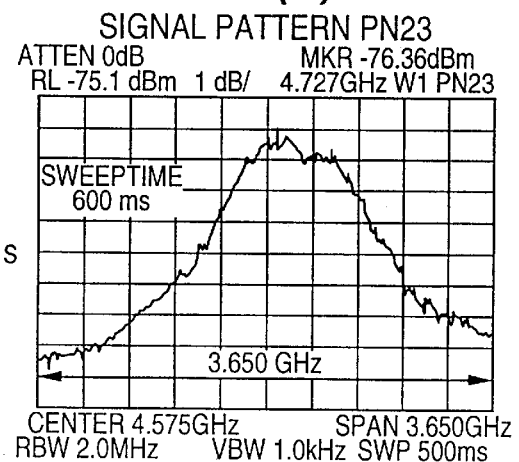
FIGS. 7(A), 7(B), 7(C) and 7(D) are graphs showing spectrum characteristics depending on different signal patterns, according to an embodiment of the present invention.
Figure 7B:
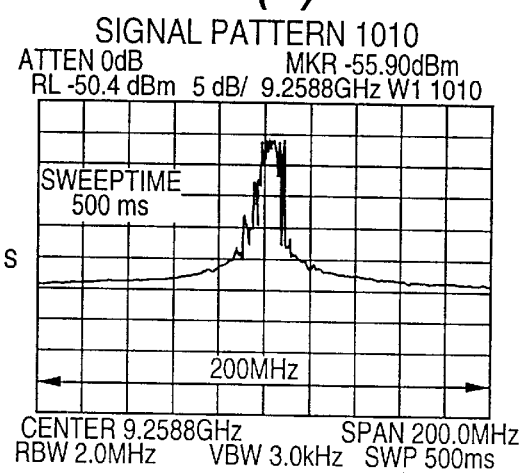
Figure 7C:
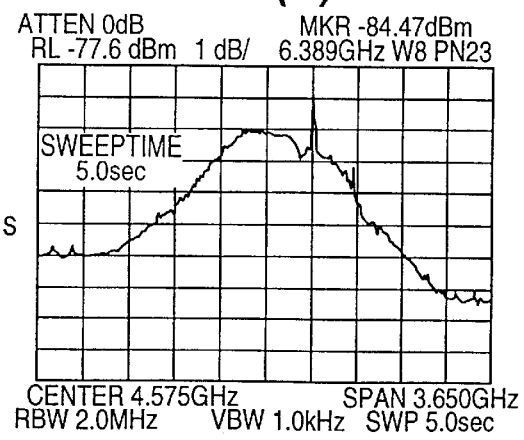
Figure 7D:
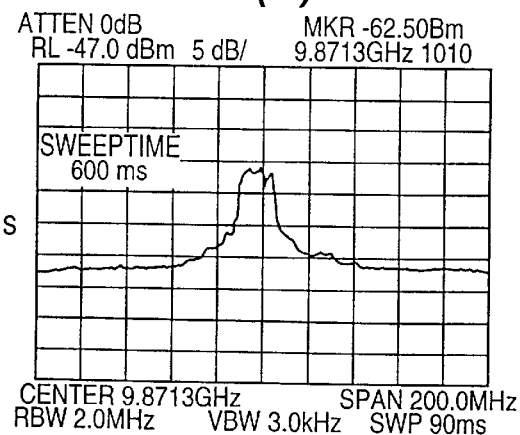
Figure 8A:
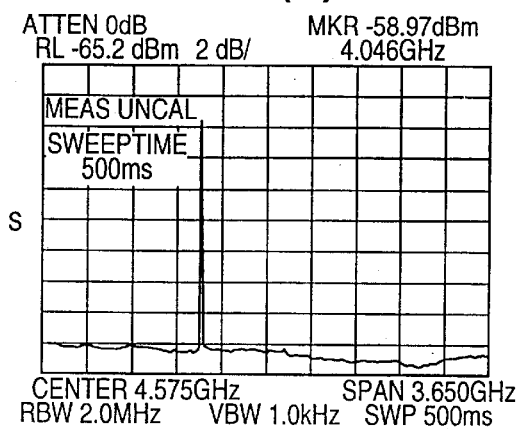
FIGS. 8(A), 8(B), 8(C) and 8(D) are graphs showing the characteristic of a wavelength W1 when the output of multiplexed wavelengths is increased, according to an embodiment of the present invention.
Figure 8B:
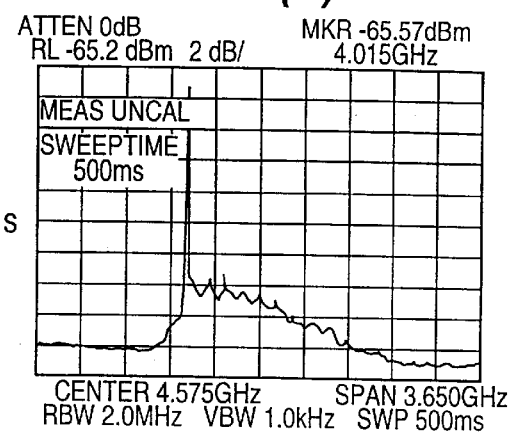
Figure 8C:
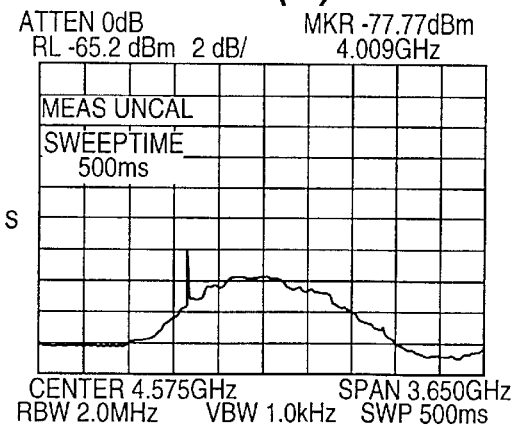
Figure 8D:
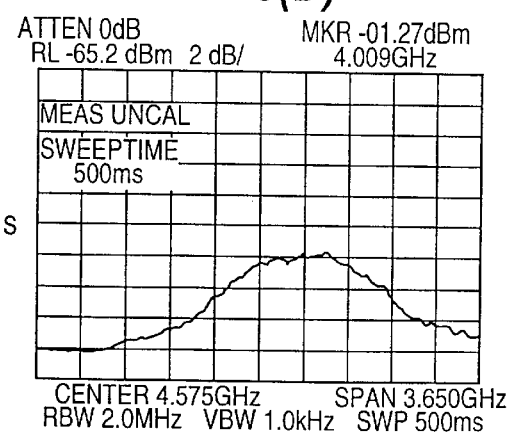

More specifically, FIG. 7(A) shows the spectrum of wavelength W1 using the modulation signal PN23 with eight multiplexed wavelengths from W1 to W8. FIG. 7(B) shows the spectrum of wavelength W1 using the alternating signal *1010* with eight multiplexed wavelengths from W1 to W8. FIG. 7(C) shows the spectrum of wavelength W8 using the modulation signal PN23 with eight multiplexed wavelengths from W1 to W8. FIG. 7(D) shows the spectrum of wavelength W8 using the modulation signal *1010* with eight multiplexed wavelengths from W1 to W8.

The spectrum obtained using the modulation signal PN23 is about ten times more spread than the spectrum shown in FIGS. 6(A), 6(B), 6(C), 6(D), 6(E), 6(F) and 6(G), and FIGS. 7(B) and 7(D).

FIGS. 8 (A), 8 (B), 8(C) and 8(D) are graphs showing the relationship between the spectrum of wavelength W1 and the intensity of the light input to optical transmission line 6 when wavelengths W1 through W8 are multiplexed. FIG. 8(A) indicates an optical input of 10 dBm to optical transmission line 6. FIG. 8(B) indicates a total optical input power of eight multiplexed light signals W1 to W8 of 19 dBm to optical transmission line 6. FIG. 8(C) indicates a total optical input power of 21 dBm to optical transmission line 6. FIG. 8(D) indicates a total optical input power of 23 dBm to optical transmission line 6.

Figure 9A:
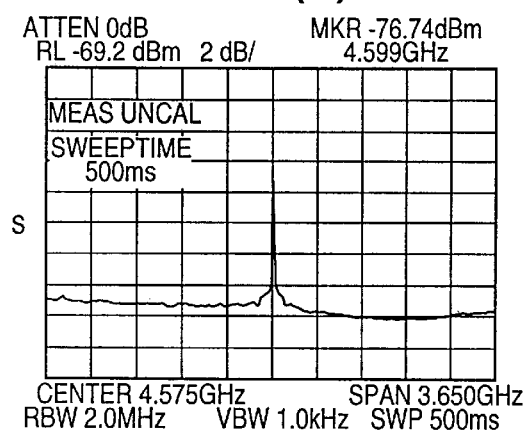
FIGS. 9(A), 9(B), 9(C) and 9(D) are graphs illustrating the characteristic of a wavelength W5 when the output of multiplexed wavelengths is increased, according to an embodiment of the present invention.
Figure 9B:
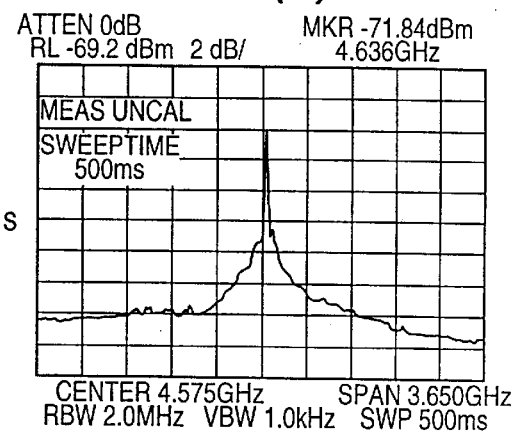
Figure 9C:
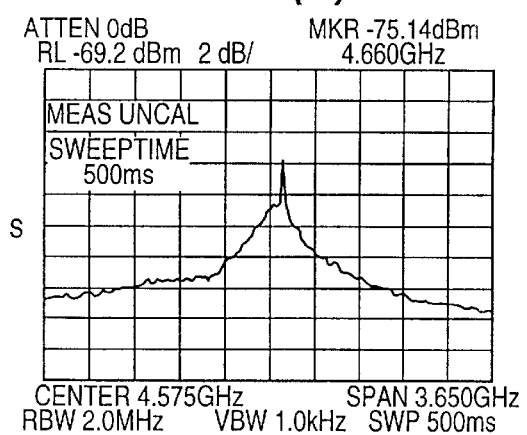
Figure 9D:
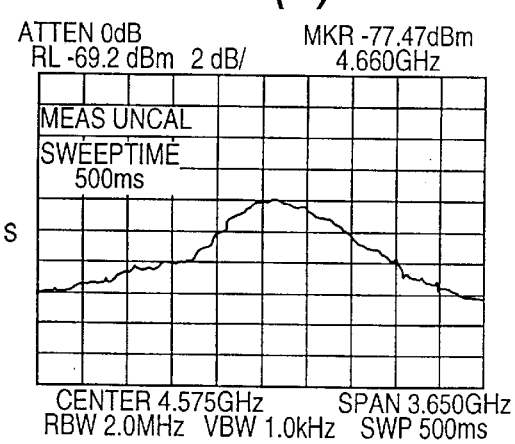

FIGS. 9(A), 9(B), 9(C) and 9(D) are graphs showing the relationship between the spectrum of wavelength W5 and the intensity of the light input to optical transmission line 6 when wavelengths W1 through W8 are multiplexed. FIG. 9 (A) indicates an optical input of 10 dBm to optical transmission line 6. FIG. 9(B) indicates an optical input of 19 dBm to optical transmission line 6. FIG. 9(C) indicates an optical input of 21 dBm to optical transmission line 6. FIG. 9(D) indicates an optical input of 23 dBm to optical transmission line 6.

Figure 10A:
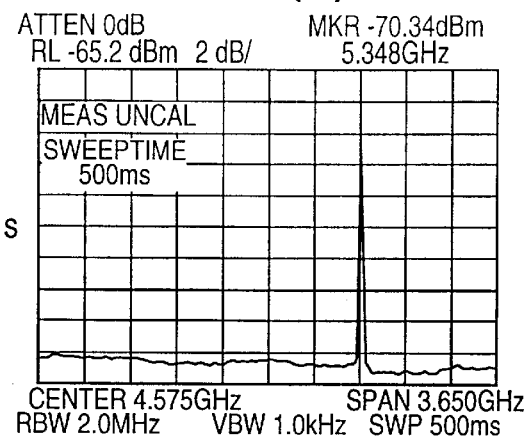
FIGS. 10(A), 10(B), 10(C) and 10(D) are graphs showing the characteristic of a wavelength W8 when the output of multiplexed wavelengths is increased, according to an embodiment of the present invention.
Figure 10B:
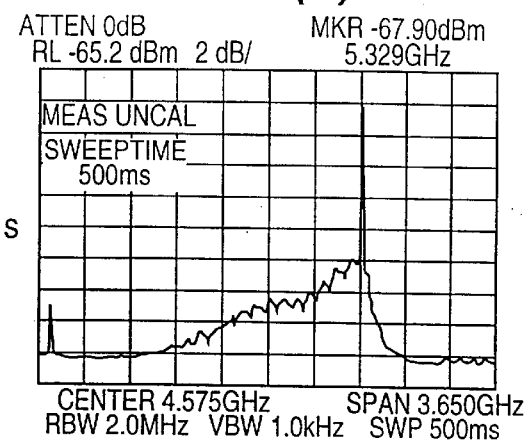
Figure 10C:
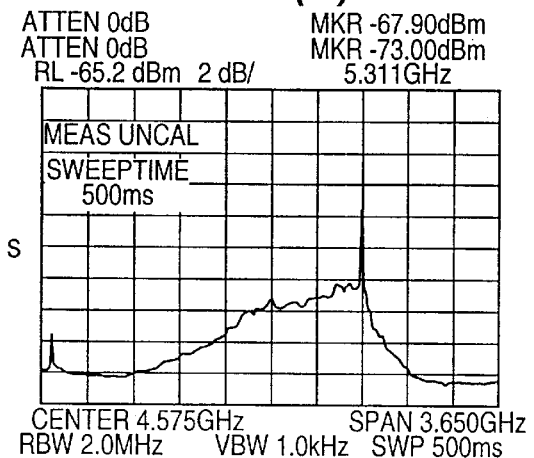
Figure 10D:
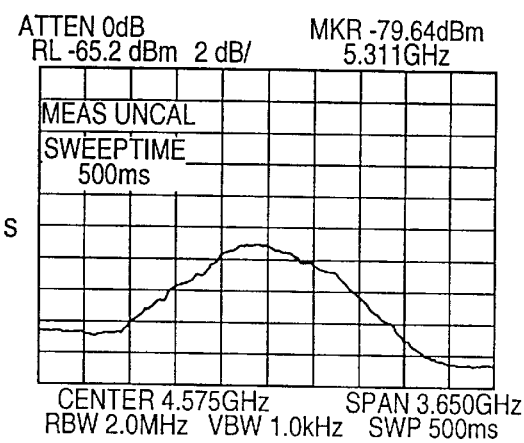

FIGS. 10(A), 10 (B), 10(C) and 10(D) are graphs showing the relationship between the spectrum of wavelength W8 and the intensity of the light input to optical transmission line 6 when wavelengths W1 through W8 are multiplexed. FIG. 10 (A) indicates an optical input of 10 dBm to optical transmission line 6. FIG. 10 (B) indicates an optical input of 19 dBm to optical transmission line 6. FIG. 10(C) indicates an optical input of 21 dBm to optical transmission line 6. FIG. 10(D) indicates an optical input of 23 dBm to optical transmission line 6.

Therefore, if the intensity of the WDM signal input to optical transmission line 6 increases as shown in FIGS. 8 through 10, the spectrum of each wavelength is spread. The spectrum is spread toward a longer wavelength about the line spectrum with the shortest wavelength W1. The spectrum is spread toward a shorter wavelength about the line spectrum with the longest wavelength W8. The spectrum is spread toward both sides about the line spectrum with the central wavelength W5.

Figure 11:
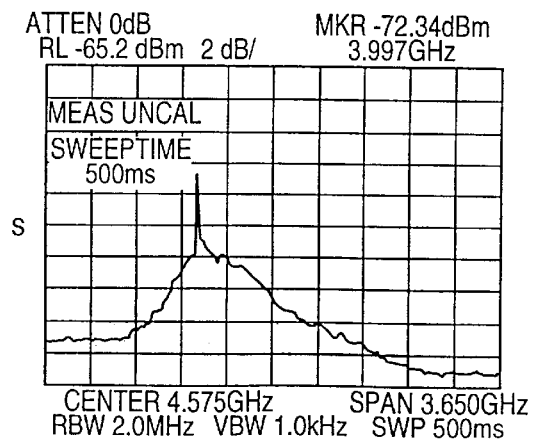
FIG. 11 is a graph showing the characteristic of a wavelength W3, according to an embodiment of the present invention.

FIG. 11 is a graph illustrating the spectrum of wavelength W3 with a light intensity 21 dBm of the WDM signal input to optical transmission line 6.

When the characteristics shown in FIG. 11 are compared with the characteristics shown in FIGS. 8 and 9, the tendency of the shortest wavelength W1 and the central wavelength W5 can be determined. That is, the spectrum is spread toward a longer wavelength about the line spectrum.

By referring to the data shown in FIGS. 8 through 11, a longer wavelength spreads its spectrum toward a shorter wavelength, whereas a shorter wavelength spreads its spectrum toward a longer wavelength. The central multiplexed-wavelength functioning as a boundary between the longer and shorter wavelengths and spreads its spectrum toward both of shorter and longer wavelengths when the output of the wavelength-multiplexed light signals of semiconductor lasers 1-1 and 1-8 are increased.

Figure 12A:
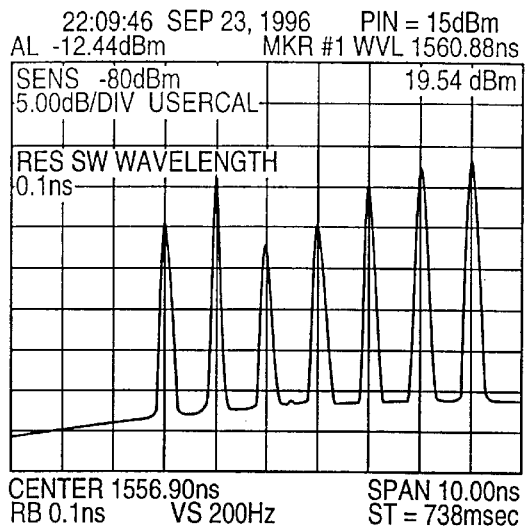
FIGS. 12(A), 12(B), 12(C); 12(D), 12(E) and 12(F) are graphs showing the characteristic of four-photon mixing of an output of multiplexed wavelengths, according to an embodiment of the present invention.
Figure 12B:
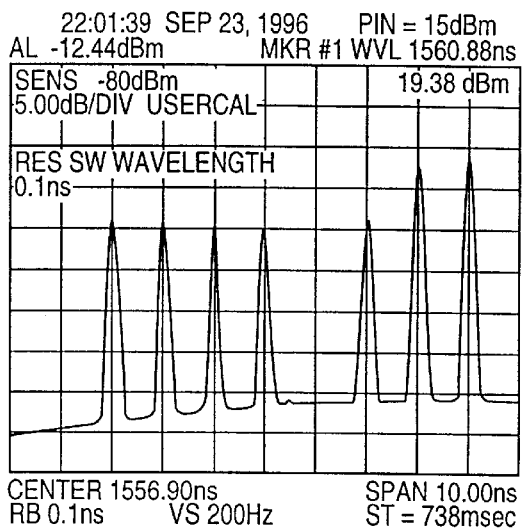
Figure 12C:
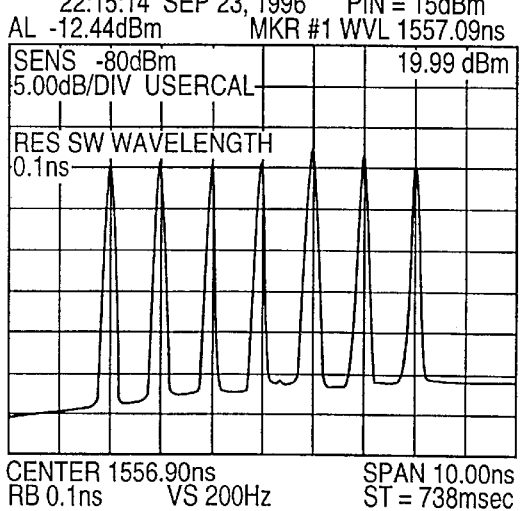
Figure 12D:
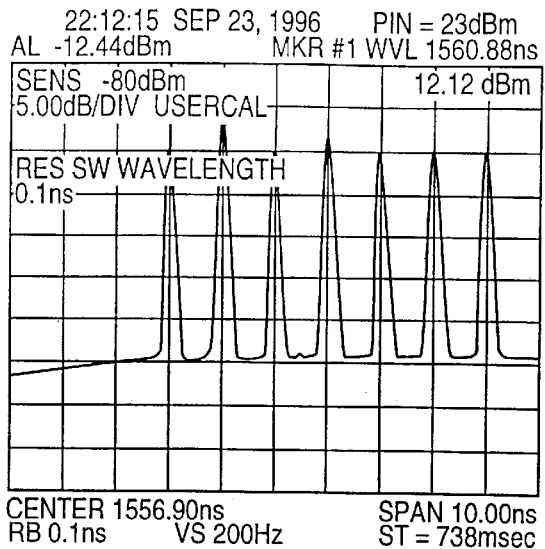
Figure 12E:
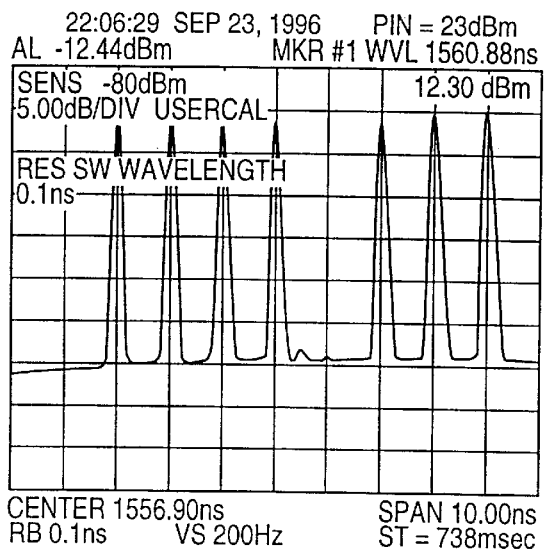
Figure 12F:
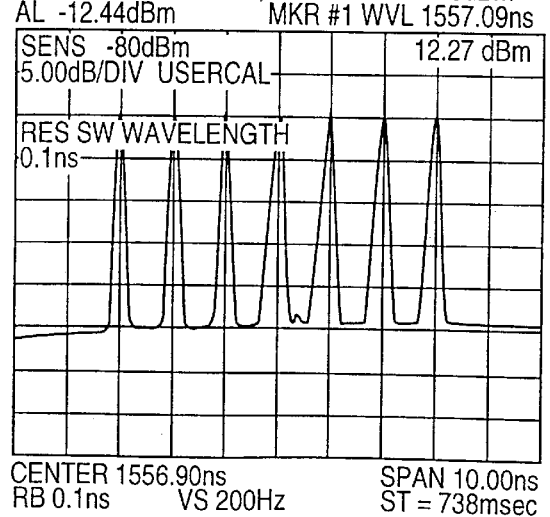

FIGS. 12(A), 12(B), 12(C), 12(D), 12(E) and 12(F) are graphs showing the wavelength characteristics when one of the multiplexed wavelengths W1 to W8 is stopped. More specifically, FIG. 12 (A) indicates the spectrum when wavelength W1 is stopped with an input of 15 dBm to optical transmission line 6. FIG. 12 (B) indicates the spectrum when wavelength W5 is stopped with an input of 15 dBm to optical transmission line 6. FIG. 12(C) indicates the spectrum when wavelength W8 is stopped with an input of 15 dBm to optical transmission line 6. FIG. 12(D) indicates the spectrum when wavelength W1 is stopped with an input of 23 dBm to optical transmission line 6. FIG. 12(E) indicates the spectrum when wavelength W5 is stopped with an input of 23 dBm to optical transmission line 6. FIG. 12(F) indicates the spectrum when wavelength W8 is stopped with an input of 23 dBm to optical transmission line 6.

When 23 dBm is input to optical transmission line 6, a bit of spectrum of four-photon mixing can be detected.

Summarizing from FIG. 2 to FIG. 12, when the number of multiplexed light signals, or wavelengths, equals or exceeds six (6), SBS is suppressed.

Moreover, a longer pseudo-random value of a signal pattern produces a higher SBS suppression effect. When the signal pattern is *1010*, SBS is not reduced.

In multiplexing wavelengths, an SBS-occurring threshold is determined by a light intensity per wave and a spectrum line width.

When a signal pattern is set as pseudo-random in a wavelength-multiplexed transmission, the spectrum line width of a transmission signal tends to spread. It is predicted herein that the spectrum line width of a light from a semiconductor laser is spread by nonlinear effect (such as, for example, a cross-phase moderation: XPM) in optical transmission line 6, and SBS is suppressed.

To effectively suppress SBS, the spectrum line width should be increased at an early stage after the light is input to optical transmission line 6.

Figure 13:
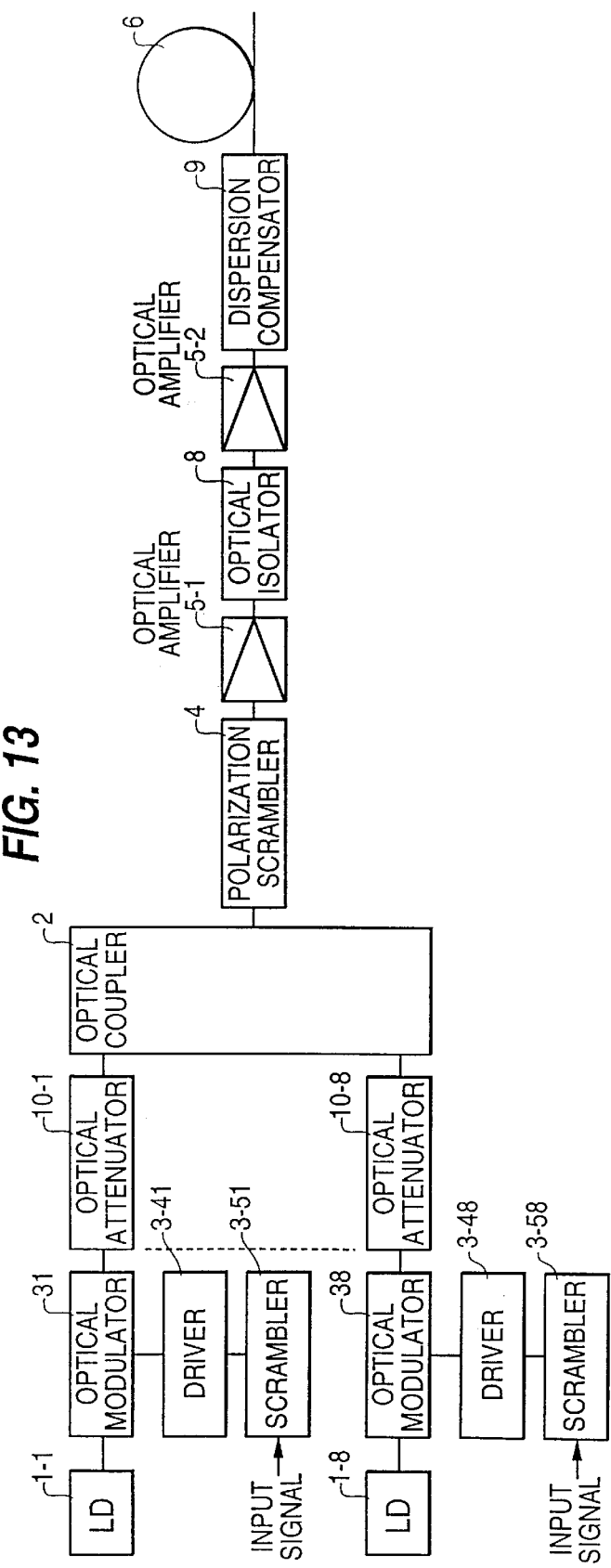
FIG. 13 is a diagram illustrating a transmission side of an optical communication system, according to an embodiment of the present invention.

FIG. 13 is a diagram illustrating a transmission side of an optical communication system, according to an embodiment of the present invention. Referring now to FIG. 13, the optical communication system includes optical modulators 31 through 38 (although only optical modulators 31 and 38 are shown), drivers 3-41 through 3-48 (although only driver 3-41 and 3-48 are shown), scramblers 3-51 through 3-58 (although only scramblers 3-51 and 3-58 are shown), attenuators 10-1 through 10-8 (although only attenuators 10-1 and 10-8 are shown), an optical isolator 8, optical amplifiers 5-1 and 5-2, and a dispersion compensator 9. However, there are many different possible configurations for the transmission side of the optical communication system, and the present invention is not intended to be limited to any specific configuration.

The interval of the wavelengths from semiconductor lasers 1-1 through 1-8 is preferably set to a value equal to or smaller than 1 nm to enlarge the influence of the XPM. Moreover, preferably, input signals to scramblers 3-51 through 3-58 are NRZ signals, to enlarge the influence of the XPM. In the present example, it is recommendable that scrambling be made at stage 7 or longer period in a maximum period sequence corresponding to PN7 or higher in a pseudo-random pattern, based on the measurement result shown in FIG. 4.

A signal output from scrambler 3-51 is input to driver 3-41 for driving optical modulator 31, and a light from semiconductor laser 1-1 is modulated by modulator 31. To modulate the light with enhanced influence of the XPM, the light is preferably digitally modulated in amplitude.

The output from modulator 31 is input to attenuator 10-1, and the output level is controlled by using the relationship between the level of a light from another semiconductor laser and a gain of an optical amplifier.

The light produced by semiconductor lasers 1-2 through 1-8 is scrambled and processed in a similar manner as that for semiconductor laser 1-1.

An output from attenuator 10-1 is wavelength-multiplexed with an output from semiconductor lasers 1-2 through 1-8 by optical coupler 2, to produce a WDM signal. The polarization of the WDM signal from optical coupler 2 is scrambled by polarization scrambler 4, and then amplified by optical amplifier 5-1.

An output from optical amplifier 5-1 is connected to optical amplifier 5-2 through optical isolator 8. Optical amplifiers 5-1 and 5-2 each comprise an erbium doped fiber (EDF) and each amplifier preferably levels amplified bands by assigning different gains. The output from optical amplifier 5-2 is higher than the light intensity of the threshold level of SBS which occurs in optical transmission line 6 when light is transmitted with a single wavelength.

The output from optical amplifier 5-2 is input to optical transmission line 6 through dispersion compensator 9 provided at the terminal of optical transmission line 6. Dispersion compensator 9 not only compensates for the dispersion of optical transmission line 6 but also intentionally generates a nonlinear effect by setting the type of dispersion compensator 9 and the amount of its dispersion compensation to a predetermined value so that the spreading of the width of the spectrum can be performed at an early stage after light is input to optical transmission line 6.

An effective dispersion compensator 9 can be, for example, a dispersion compensation fiber (DCF) or a dispersion shifted fiber (DSF) indicating the largest nonlinear effect and guaranteeing dispersion compensation of an optical transmission line.

Figure 14:
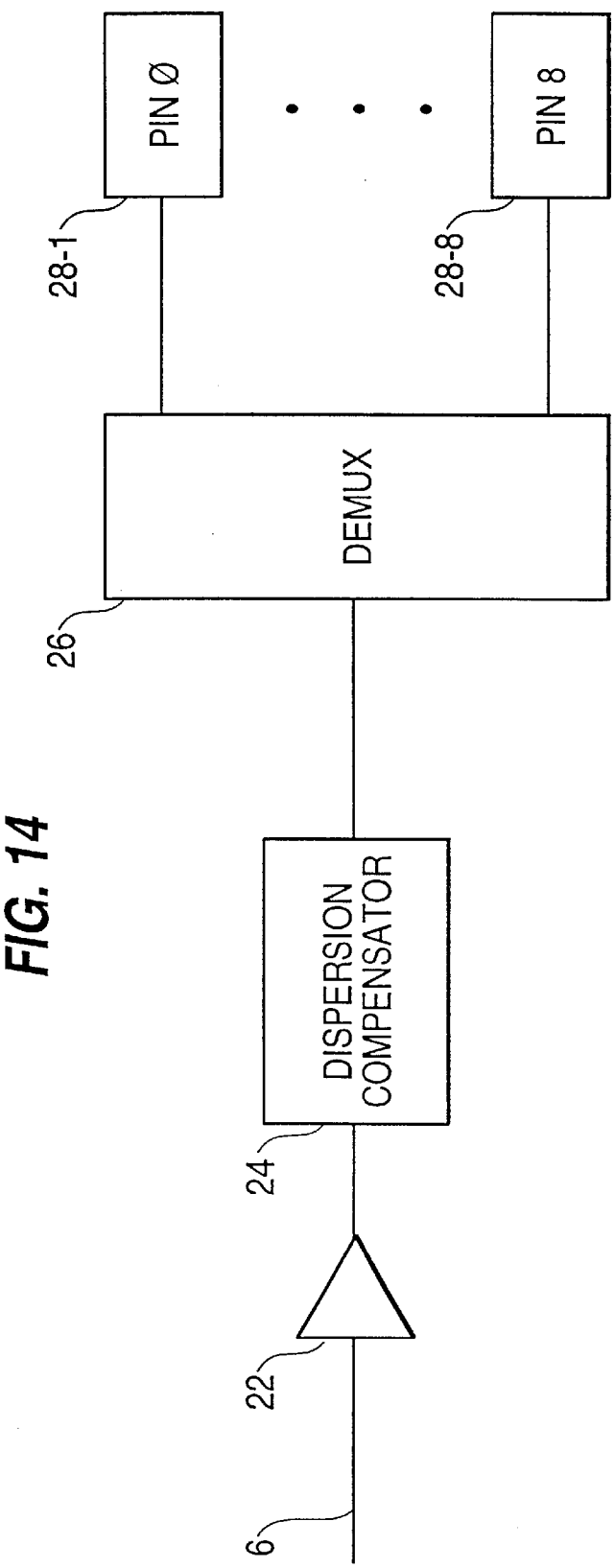
FIG. 14 is a diagram illustrating a reception side of an optical communication system, according to an embodiment of the present invention.

FIG. 14 is a diagram illustrating a reception side of an optical communication system, according to an embodiment of the present invention.

Referring now to FIG. 14, a WDM signal is transmitted through optical transmission line 6 and is amplified by a preamplifier 22. A dispersion compensator 24 can be provided to compensate for dispersion. A demultiplexer 26 demultiplexes the WDM signal into individual signal lights which are detected by receivers 28-1 through 28-8 which can be, for example, PIN photodiodes, or APD diodes. Of course, there are many different possible configuration for the reception side of an optical communication system, and the present invention is not intended to be limited to any specific configuration.

According to the above embodiments of the present invention, SBS can be suppressed by setting the light intensity of a WDM signal transmitted through an optical transmission line to be higher than the light intensity at which SBS occurs for a single light transmitted through the optical transmission line. Furthermore, the SBS suppression effect can be improved by scrambling an input signal at stage 7 or longer period in a maximum period sequence. The SBS suppression effect can also be improved by using an input signal of NRZ, digitally modulating the optical amplitude, and shortening the wavelength interval to 1 nm or less.

The above embodiments of the present invention illustrate an optical communication system having a specific number of semiconductor lasers, each producing a respective light signal. However, the present invention is not intended to be limited to a specific number of semiconductor lasers or a specific number of wavelength multiplexed signal lights. Moreover, the present invention is not intended to be limited to the use of any specific type of light source.

Therefore, according to the above embodiment of the present invention, a WDM signal is transmitted to an optical transmission line so that the intensity per light signal is higher than an intensity threshold at which stimulated Brillouin scattering (SBS) occurs for a single light signal individually transmitted to the optical transmission line. For example, in FIG. 1, each semiconductor laser 1-1 through 1-8 can produce a respective light signal which is higher than the intensity threshold at which SBS occurs for a single light signal. These relatively high intensity light signals can then be combined into a relatively high intensity WDM signal which is transmitted through optical transmission line 6. The present invention recognizes that SBS is substantially reduced or eliminated in this situation, especially when at least six (6) light signals are multiplexed together. This can be contrasted to conventional techniques which required each light signal in the WDM signal to be less than the intensity threshold at which SBS occurs for a single light signal.

Various of the above embodiments of the present invention relate to the use of pseudo-random patterns, such as those described above as PN 7 or PN 23. Pseudo-random patterns are often generated in accordance with standard, well-known testing pattern guidelines, to provide a random pattern having a specific period. The generation of pseudo-random patterns is well-known by persons of skill in the art.

For example, such pseudo random patterns are generated by various logic components, such as flip-flops, connected together to provide an appropriate pattern. For example, pseudo-random pattern PN 7 refers to logical elements, such as flip-flops, connected together in seven (7) stages to produce a random pattern having a period of $(2^7-1)$ bits. Similarly, for example, pseudo-random pattern PN 23 refers to logical elements connected together in twenty-three (23) stages to produce a random pattern having a period of $(2^{23}-1)$ bits. Pseudo-random pattern PN 23 is a random pattern having a longer period than pseudo-random pattern PN 7.

Therefore, a pattern can be described in relation to the number of stages for producing the pattern. For example, a seven stage pattern is a pattern having a period of $(2^7-1)$ bits. PN 7 is such a seven stage pattern. A pattern which is longer than a seven stage pattern would have more than seven stages and would have a period longer than $(2^7-1)$ bits. PN 23 is pattern which is longer than PN 7 and therefore has a period longer than $(2^7-1)$ bits. The use of stages to create patterns is well-known in the art.

Therefore, the above embodiments of the present invention relate to a light signal which is modulated in intensity using data scrambled at stage 7 or longer, to thereby suppress SBS. As described above, in this case, stage 7 or longer refers to patterns having a period of $(2^7-1)$ bits or longer.

Figures 15, 16:
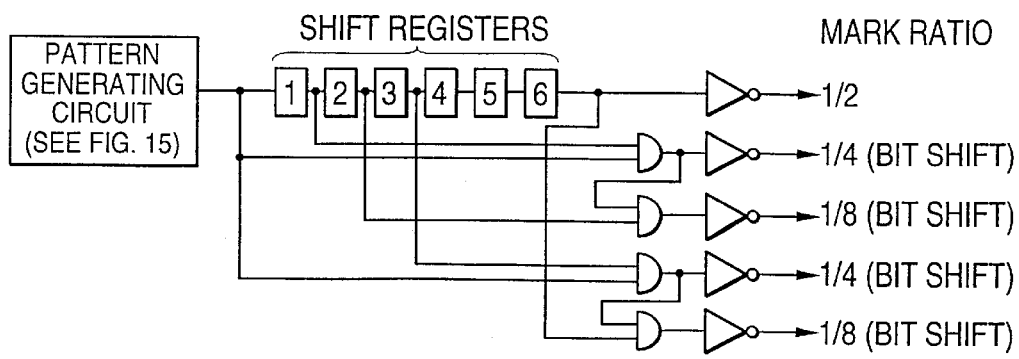
FIG. 15 (prior art) is a table illustrating the generation of pseudo-random patterns using shift registers connected in stages.
FIG. 16 (prior art) is a diagram illustrating a pattern generating circuit in accordance with the table of FIG. 15.

FIG. 15 is a table illustrating the generation of pseudo-random patterns using shift registers connected in stages. FIG. 16 is a diagram illustrating a pattern generating circuit in accordance with the table of FIG. 15. FIGS. 15 and 16 are included in the ANRITSU Pulse Pattern Generator MP1650A Instruction Book, Chapter 6, Principle of Operations, which is incorporated herein be reference.

The generation of pseudo-random patterns can also be understood, for example, from the International Telecommunication Union (ITU), International Telegraph and Telephone Consultative Committee (CCITT), "Specification of Measuring Equipment, Error Performance Measuring Equipment Operating At The Primary Rate And Above", Recommendation 0.151, October 1992, and also from the International Telecommunication Union (ITU), Telecommunication Standardization Sector of the ITU (ITU-T), "General requirements for instrumentation for performance measurements on digital transmission equipment", Recommendation 0.150, May, 1996, which are incorporated herein by reference.

In the above embodiments of the present invention, a transmitter transmits a WDM signal to an optical transmission line. For example, in FIG. 1, the various semiconductor lasers 1-1 through 1-8, together with optical coupler 2, would constitute a transmitter which transmits a WDM signal. Similarly, for example, in FIG. 13, the various semiconductor lasers 1-1 through 1-8, optical coupler 2, and the various other elements connected between the semiconductor lasers and the optical coupler would together constitute a transmitter which transmits a WDM signal. However, there are many different configurations for a transmitter which transmits a WDM signal, and the present invention is not intended to be limited to any specific configuration.

Similarly, in the above embodiments of the present invention, a receiver receives a WDM signal from an optical transmission line. For example, in FIG. 14, demultiplexer 26 and the various individual receivers 28-1 through 28-8 can together be considered to be a receiver which receives a WDM signal. Alternatively, in a different configuration, an individual receiver, such as receiver 28-1, could possibly receive a WDM signal and would therefore be considered to be a receiver which receives a WDM signal. Therefore, there are many different configurations for a receiver which receives a WDM signal, and the present invention is not intended to be limited to any specific configuration.

In the above embodiments of the present invention, SBS is described as being related to the intensity level of light input to an optical transmission line. It should be noted that, generally, SBS is also dependent on the wavelength of the light. However, in optical communication systems employing WDM, the WDM bandwidth is relatively narrow so that the wavelength dependence of SBS can be ignored.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for transmitting a wavelength division multiplexed (WDM) signal which includes a plurality of light signals multiplexed together, the apparatus comprising:
    a transmitter transmitting the WDM signal to an optical transmission line so that the intensity per light signal is higher than an intensity threshold at which stimulated Brillouin scattering (SBS) occurs for a single light signal individually transmitted to the optical transmission line, to thereby suppress SBS in the transmission line.

2. An apparatus as in claim 1, wherein the WDM signal includes at least six light signals multiplexed together.

3. An apparatus as in claim 1, further comprising:
    a modulator modulating the light signals in intensity with data scrambled at stage 7 or longer.

4. An apparatus as in claim 1, wherein the plurality of light signals are at a plurality of wavelengths, respectively, the plurality of wavelengths being separated by 1 nm or less.

5. An apparatus as in claim 1, wherein the intensity of each light signal is higher than the intensity threshold at which SBS occurs for a single light signal individually transmitted to the optical transmission line.

6. An apparatus as in claim 2, wherein the intensity of each light signal is higher than the intensity threshold at which SBS occurs for a single light signal individually transmitted to the optical transmission line.

7. An apparatus comprising:
    an optical transmission line;
    a plurality of light sources producing a plurality of respectively corresponding light signals, each light signal at a different wavelength than the other light signals;
    a plurality of modulation units modulating the plurality of light signals, respectively;
    a multiplexer multiplexing the plurality of modulated light signals into a wavelength division multiplexed (WDM) signal, wherein the WDM signal is transmitted through the optical transmission line so that the intensity per light signal is higher than an intensity threshold at which stimulated Brillouin scattering (SBS) occurs for a single light signal individually transmitted to the optical transmission line to thereby suppress SBS.

8. An apparatus as in claim 7, further comprising:
    an optical amplifier amplifying the WDM signal as the WDM signal is transmitted through the optical transmission line.

9. An apparatus as in claim 7, wherein the multiplexer comprises a coupler for multiplexing the modulated light signals.

10. An apparatus as in claim 7, wherein the WDM signal includes at least six light signals multiplexed together.

11. An apparatus as in claim 7, wherein each modulation unit comprises:
    a scrambler scrambling a data signal; and
    a modulator modulating the respective light signal of the modulation unit with the scrambled data signal.

12. An apparatus as in claim 11, wherein the scrambler scrambles the data signal at stage 7 or longer.

13. An apparatus as in claim 11, wherein the modulated light signal is an NRZ signal.

14. An apparatus as in claim 11, wherein the modulating unit digitally modulates the corresponding light signal in amplitude.

15. An apparatus as in claim 7, wherein the light signals are at wavelengths separated by 1 nm or less.

16. An apparatus as in claim 7, further comprising:
    a dispersion compensator compensating for dispersion in the WDM signal transmitted through the optical transmission line.

17. An apparatus as in claim 7, wherein the intensity of each light signal is higher than the intensity threshold at which SBS occurs for a single light signal individually transmitted to the optical transmission line.

18. An optical communication system comprising:
    an optical transmission line;
    at least six light sources, each light source producing a corresponding light signal, the light signal produced by each respective light source being at a different wavelength than the light signals produced by the other light sources;
    at least six modulators corresponding, respectively, to the at least six light sources, each modulator modulating the light signal produced by the corresponding light source;

a multiplexer multiplexing the modulated light signals into a wavelength division multiplexed (WDM) signal, wherein the WDM signal is transmitted through the optical transmission line so that the intensity per light signal is higher than an intensity threshold at which stimulated Brillouin scattering (SBS) occurs for a single light signal individually transmitted to the optical transmission line to thereby suppress SBS.

19. An optical communication system as in claim 18, wherein the intensity of each light signal is higher than the intensity threshold at which SBS occurs for a single light signal individually transmitted to the optical transmission line.

20. An optical communication system comprising:
   an optical transmission line;
   at least six light sources, each light source producing a corresponding light signal, the light signal produced by each respective light source being at a different wavelength than the light signals produced by the other light sources;
   a multiplexer multiplexing the light signals into a wavelength division multiplexed (WDM) signal, wherein the WDM signal is transmitted through the optical transmission line so that the intensity per light signal is higher than an intensity threshold at which stimulated Brillouin scattering (SBS) occurs for a single light signal individually transmitted to the optical transmission line to thereby suppress SBS.

21. An optical communication system as in claim 20, wherein the intensity of each light signal is higher than the intensity threshold at which SBS occurs for a single light signal individually transmitted to the optical transmission line.

22. A method for transmitting a wavelength division multiplexed (WDM) signal which includes a plurality of light signals multiplexed together, the method comprising:
   transmitting the WDM signal to an optical transmission line so that the intensity per light signal is higher than an intensity threshold at which stimulated Brillouin scattering (SBS) occurs for a single light signal individually transmitted to the optical transmission line, to thereby suppress SBS in the transmission line.

23. A method as in claim 22, wherein the WDM signal includes at least six light signals multiplexed together.

24. A method as in claim 22, wherein the light signals are modulated in intensity using data scrambled at stage 7 or longer.

25. A method as in claim 22, wherein the plurality of light signals are at a plurality of wavelengths, respectively, the plurality of wavelengths being separated by 1 nm or less.

26. A method as in claim 22, wherein the intensity of each light signal is higher than the intensity threshold at which SBS occurs for a single light signal individually transmitted to the optical transmission line.

27. A method as in claim 23, wherein the intensity of each light signal is higher than the intensity threshold at which SBS occurs for a single light signal individually transmitted to the optical transmission line.

28. A method comprising:
   combining at least six light signals into a wavelength division multiplexed (WDM) signal;
   transmitting the WDM signal to an optical transmission line so that the intensity per light signal is higher than an intensity threshold at which stimulated Brillouin scattering (SBS) occurs for a single light signal individually transmitted to the optical transmission line, to thereby suppress SBS.

29. A method as in claim 28, wherein the intensity of each light signal is higher than the intensity threshold at which SBS occurs for a single light signal individually transmitted to the optical transmission line.

30. An optical communication system comprising:
   an optical transmission line;
   a transmitter transmitting a wavelength division multiplexed (WDM) signal to the optical transmission line, the WDM signal including a plurality of light signals multiplexed together and the WDM signal being transmitted so that the intensity per light signal is higher than an intensity threshold at which stimulated Brillouin scattering (SBS) occurs for a single light signal individually transmitted to the optical transmission line, to thereby suppress SBS; and
   a receiver receiving the WDM signal transmitted through the optical transmission line.

31. An optical communication system as in claim 30, wherein the WDM signal is transmitted so that the intensity of each light signal is higher than the intensity threshold at which SBS occurs for a single light signal individually transmitted to the optical transmission line.

32. An optical communication system as in claim 30, wherein the WDM signal includes at least six light signals multiplexed together.

33. An apparatus comprising:
   a receiver receiving a wavelength division multiplexed (WDM) signal transmitted through an optical transmission line, the WDM signal including a plurality of light signals multiplexed together and the WDM signal being transmitted so that the intensity per light signal is higher than an intensity threshold at which stimulated Brillouin scattering (SBS) occurs for a single light signal individually transmitted to the optical transmission line to thereby suppress SBS.

34. An apparatus as in claim 33, wherein the WDM signal is transmitted so that the intensity of each light signal is higher than the intensity threshold at which SBS occurs for a single light signal individually transmitted to the optical transmission line.

35. An apparatus as in claim 33, wherein the WDM signal includes at least six light signals multiplexed together.

36. A method comprising:
   transmitting a wavelength division multiplexed (WDM) signal to an optical transmission line, the WDM signal including a plurality of light signals multiplexed together and the WDM signal being transmitted so that the intensity per light signal is higher than an intensity threshold at which stimulated Brillouin scattering (SBS) occurs for a single light signal individually transmitted to the optical transmission line to thereby suppress SBS; and
   receiving the WDM signal transmitted through the optical transmission line.

37. A method as in claim 36, wherein the WDM signal is transmitted so that the intensity of each light signal is higher than the intensity threshold at which SBS occurs for a single light signal individually transmitted to the optical transmission line.

38. A method as in claim 36, wherein the WDM signal includes at least six light signals multiplexed together.

39. A method comprising:
   receiving a wavelength division multiplexed (WDM) signal transmitted through an optical transmission line, the WDM signal including a plurality of light signals multiplexed together and the WDM signal being transmitted so that the intensity per light signal is higher than an intensity threshold at which stimulated Brillouin scattering (SBS) occurs for a single light signal individually transmitted to the optical transmission line to thereby suppress SBS.

40. A method as in claim 39, wherein the WDM signal is transmitted so that the intensity of each light signal is higher than the intensity threshold at which SBS occurs for a single light signal individually transmitted to the optical transmission line.

41. A method as in claim 39, wherein the WDM signal includes at least six light signals multiplexed together.

42. An apparatus for transmitting a wavelength division multiplexed (WDM) signal which includes a plurality of light signals multiplexed together, the apparatus comprising:
 a transmitter transmitting the WDM signal to an optical transmission line, the transmitter suppressing stimulated Brillouin scattering (SBS) by transmitting the WDM signal with an intensity per light signal higher than an intensity threshold at which SBS occurs for a single light signal individually transmitted to the optical transmission line.

43. An apparatus as in claim 42, wherein the WDM signal includes at least six light signals multiplexed together.

44. An apparatus as in claim 42, further comprising:
 a modulator modulating the light signals in intensity with data scrambled at stage 7 or longer.

45. An apparatus as in claim 42, wherein the plurality of light signals are at a plurality of wavelengths, respectively, the plurality of wavelengths being separated by 1 nm or less.

46. A method for transmitting a wavelength division multiplexed (WDM) signal which includes a plurality of light signals multiplexed together, the method comprising:
 transmitting the WDM signal to an optical transmission line; and
 suppressing stimulated Brillouin scattering (SBS) by causing said transmitting to transmit the WDM signal to the optical transmission line so that the intensity per light is higher than an intensity threshold at which SBS occurs for a single light signal individually transmitted to the optical transmission line.

47. A method as in claim 46, wherein the WDM signal includes at least six light signals multiplexed together.

48. A method as in claim 46, wherein the light signals are modulated in intensity using data scrambled at stage 7 or longer.

49. A method as in claim 46, wherein the plurality of light signals are at a plurality of wavelengths, respectively, the plurality of wavelengths being separated by 1 nm or less.

50. An apparatus for transmitting a wavelength division multiplexed (WDM) signal which includes a plurality of light signals multiplexed together, the apparatus comprising:
 a transmitter transmitting the WDM signal to an optical transmission line; and
 means for suppressing stimulated Brillouin scattering (SBS) by causing the transmitter to transmit the WDM signal to the optical transmission line so that the intensity per light signal is higher than an intensity threshold at which SBS occurs for a single light single individually transmitted to the optical transmission line.

* * * * *